United States Patent
Barmawer et al.

(10) Patent No.: US 12,287,734 B2
(45) Date of Patent: Apr. 29, 2025

(54) CLIENT ALLOCATION OF MEMORY ACROSS MEMORY SERVERS

(71) Applicant: HEWLETT PACKARD ENTERPRISE DEVELOPMENT LP, Houston, TX (US)

(72) Inventors: Syed Ismail Faizan Barmawer, Karnataka (IN); Gautham Bhat Kumbla, Karnataka (IN); Mashood Abdulla Kodavanji, Karnataka (IN); Clarete Riana Crasta, Karnataka (IN); Sharad Singhal, Belmont, CA (US); Ramya Ahobala Rao, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 342 days.

(21) Appl. No.: 17/815,366

(22) Filed: Jul. 27, 2022

(65) Prior Publication Data
US 2024/0037029 A1 Feb. 1, 2024

(51) Int. Cl.
G06F 12/06 (2006.01)

(52) U.S. Cl.
CPC .... *G06F 12/0607* (2013.01); *G06F 2212/154* (2013.01)

(58) Field of Classification Search
CPC .................. G06F 12/0607; G06F 2212/154
USPC ....................................................... 711/157
See application file for complete search history.

(56) References Cited

U.S. PATENT DOCUMENTS

| 1,070,595 | A |   | 8/1913  | Frey |
|-----------|---|---|---------|------|
| 6,101,508 | A | * | 8/2000  | Wolff ..................... G06F 16/182 709/200 |
| 8,072,463 | B1| * | 12/2011 | Van Dyke ........... G06F 12/0607 345/568 |

(Continued)

FOREIGN PATENT DOCUMENTS

CN          114077386          2/2022

OTHER PUBLICATIONS

V. R. Kommareddy, C. Hughes, S. D. Hammond and A. Awad, "DeACT: Architecture-Aware Virtual Memory Support for Fabric Attached Memory Systems," 2021 IEEE International Symposium on High-Performance Computer Architecture (HPCA), Seoul, Korea (South), 2021, pp. 453-466, doi: 10.1109/HPCA51647.2021.00046. (Year: 2021).*

(Continued)

*Primary Examiner* — Reginald G Bragdon
*Assistant Examiner* — Aaron D Ho
(74) *Attorney, Agent, or Firm* — Fletcher Yoder, P.C.

(57) ABSTRACT

In some examples, a computer identifies a plurality of memory servers accessible by the computer to perform remote access over a network of data stored by the plurality of memory servers, sends allocation requests to allocate memory segments to place interleaved data of the computer across the plurality of memory servers, and receives, at the computer in response to the allocation requests, metadata relating to the memory segments at the plurality of memory servers, the metadata comprising addresses of the memory segments at the plurality of memory servers. The computer uses the metadata to access, by the computer, the interleaved data at the plurality of memory servers, the interleaved data comprising blocks of data distributed across the memory segments.

20 Claims, 8 Drawing Sheets

(56) References Cited

U.S. PATENT DOCUMENTS

| | | | |
|---|---|---|---|
| 8,090,790 | B2 | 1/2012 | Bestler |
| 9,652,175 | B2 | 5/2017 | Vanaraj et al. |
| 10,445,229 | B1* | 10/2019 | Kuzmin ................. G06F 12/10 |
| 11,182,309 | B2 | 11/2021 | Feehrer et al. |
| 2014/0059232 | A1* | 2/2014 | Plattner .............. H04L 67/1029 |
| | | | 709/226 |
| 2019/0042408 | A1* | 2/2019 | Schmisseur ......... H04L 41/0668 |
| 2020/0042358 | A1* | 2/2020 | Sun ..................... G06F 12/0284 |
| 2021/0133123 | A1 | 5/2021 | Feehrer et al. |
| 2021/0149797 | A1* | 5/2021 | Kanno ................ G06F 13/4068 |
| 2022/0222010 | A1* | 7/2022 | Bachmutsky ......... G06F 3/0655 |
| 2023/0289288 | A1* | 9/2023 | Agarwal ............. G06F 12/0888 |

OTHER PUBLICATIONS

C. Seiculescu, L. Benini, and G. De Micheli. 2012. A distributed interleaving scheme for efficient access to WideIO DRAM memory. In Proceedings of the eighth IEEE/ACM/IFIP international conference on Hardware/software codesign and system synthesis (CODES+ISSS '12). Association for Computing Machinery. (Year: 2012).*

"OpenFAM Reference Implementation downloaded" Jun. 28, 2022, 4 pages.

CXL, "Compute Express Link ™: The Breakthrough CPU-to-Device Interconnect", Jun. 28, 2022, 2 pages.

Gauger et al., "Modeling and Performance Evaluation of iSCSI Storage Area Networks over TCP/IP-based MAN and WAN networks", Oct. 2005, 10 pages.

OpenFabrics Interfaces Working Group, "Libfabric OpenFabrics", Jul. 15, 2022, 3 pages.

Perumal et al., "A tutorial on RAID storage systems", May 6, 2004, 23 pages.

Pfister et al., "PFISTER, An Introduction to the InfiniBand", Part IX: Emerging Technologies and Future Trends, Chapter 42, pp. 617-632.

Sensi et al., "An In-Depth Analysis of the Slingshot Interconnect", Aug. 20, 2020, 13 pages.

Tierney et al., "Efficient Data Transfer Protocols for Big Data", Oct. 2012, 9 pages.

Wikipedia, "Remote direct memory access", available online at <https://en.wikipedia.org/w/index.php?title=Remote_direct_memory_access&oldid=1093871583>, Jun. 19, 2022, 3 pages.

* cited by examiner

CLIENT ALLOCATION OF MEMORY ACROSS MEMORY SERVERS

BACKGROUND

Fabric attached memory refers to memory that is accessible over a fabric by any of multiple clients. A "fabric" can refer to a network that allows for communications between computing nodes connected to the network. In some examples, the fabric attached memory is implemented using memory devices, such as flash memory devices or other types of persistent memory devices.

BRIEF DESCRIPTION OF THE DRAWINGS

Some implementations of the present disclosure are described with respect to the following figures.

Figure 1:
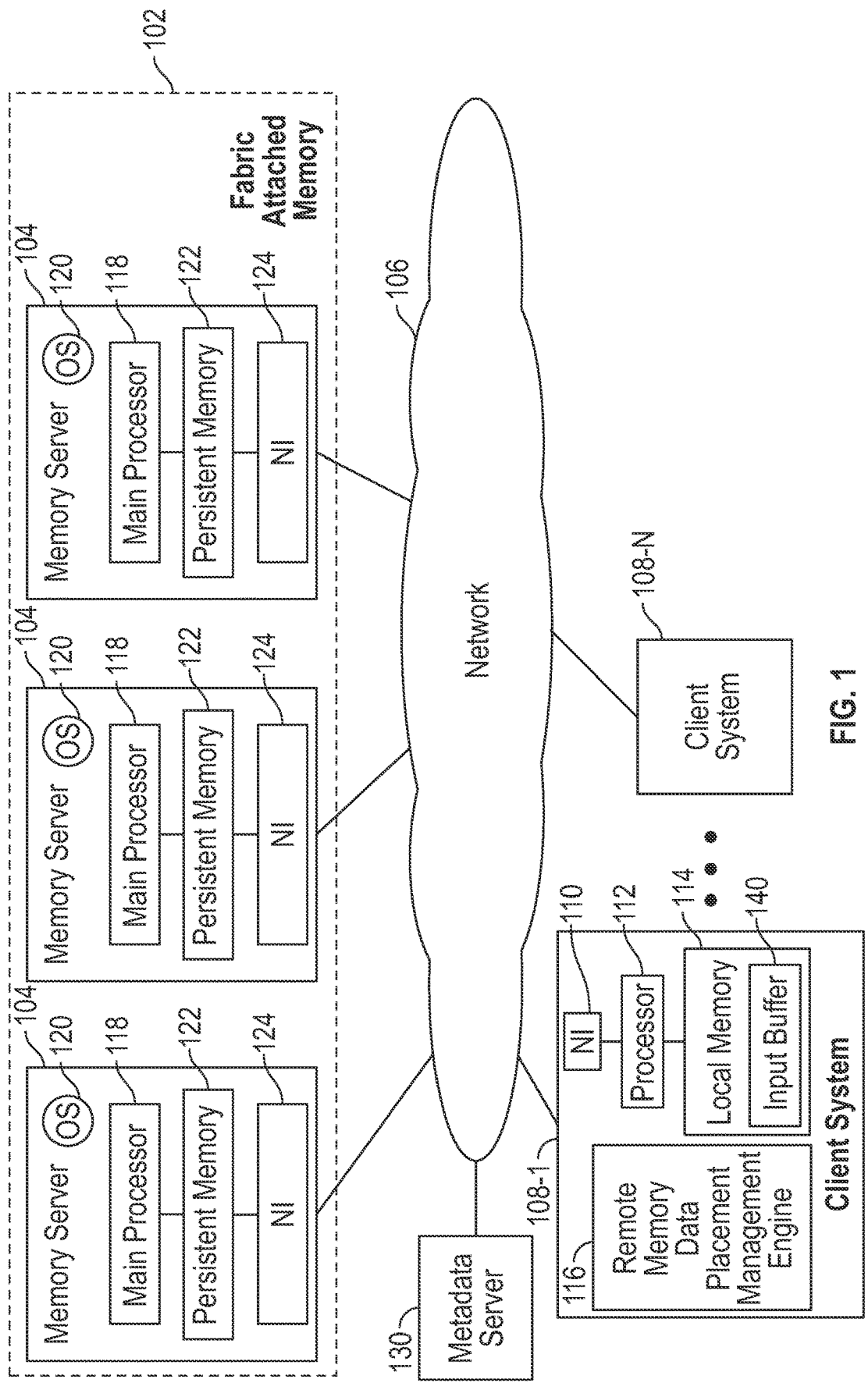
FIG. 1 is a block diagram of an arrangement that includes a fabric attached memory including memory servers coupled to a network, and client systems that are able to access the fabric attached memory over a network, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Clients are able perform remote access (remote read or remote write) of fabric attached memory. A "client" can refer to any entity (a machine or a program) that is able to issue requests to access data in the fabric attached memory. Examples of networks over which clients are able to access fabric attached memory include any or some combination of the following: a COMPUTE EXPRESS LINK (CXL) interconnect, a Slingshot interconnect, an InfiniBand interconnect, and so forth.

A fabric attached memory can include a distributed arrangement of memory servers, where each memory server can include a persistent memory or may be coupled to a persistent memory. In some examples, clients can access the fabric attached memory using Remote Direct Memory Access (RDMA) over a network.

An RDMA data transfer from a client to a memory server involves a transfer of data from the client over the network to a persistent memory of the memory server, where the data transfer does not involve work performed by a main processor of the memory server. A "main processor" of a memory server can refer to the processor that executes the operating system (OS) and other machine-readable instructions (including firmware such as a Basic Input/Output System or BIOS and an application program) of the memory server.

In an RDMA data transfer, data is passed to or from the client over the network through a network interface of the memory server from or to the persistent memory of the memory server. A "network interface" can refer to a network communication component that transmits and receives signals, messages, packets, etc. (more generally, "information"), over a network. The network interface can include a network transceiver that transmits and receives information.

A memory server can include main memory including a collection of memory devices (a single memory device or multiple memory devices), such as dynamic random access memory (DRAM) devices, static random access memory (SRAM) devices, and so forth. The memory server can also include cache memory, which can be part of the main processor or associated with the main processor. The cache memory is associated with the main processor if the main processor uses the cache memory to store data used by the main processor.

Note that since the data of the RDMA data transfer passes through the network interface of the memory server, the data may be stored in a memory of the network interface, and may be processed by a processor of the network interface. However, the processor and the memory of the network interface is separate and distinct from the main processor and the cache memory that is part of or associated with the main processor.

In some cases, because the main processors of memory servers are not involved in RDMA data transfers, data placement and distribution across a collection of memory servers are not managed by the memory servers—note that a memory server may control where in the main memory of the memory server data is placed, but the memory server does not control which data goes to which memory server of the collection of memory servers. In some cases, placement of data can be skewed across the memory servers where significantly more data for a given client load of the client may be placed at a first memory server as compared to other memory server(s). Skewed data placement can result in a bottleneck at the first memory server leading to data operations taking a longer time to complete at the first memory server than at the other memory server(s).

Moreover, if RDMA is used, then a centralized controller may not be used for managing data placement across memory servers, since with RDMA, clients write data directly to the persistent memory of the memory servers. Also, using a centralized controller would add to the complexity and cost associated with use of a fabric attached memory.

In accordance with some implementations of the present disclosure, a client that is able to remotely access memory servers over a network is able to control placement of data across memory segments of the memory servers, without relying on coordination by a central controller for management of data placement. The data for a given data item can be distributed across the memory servers. A "data item" can refer to a file, an object, a collection of files or objects, or any other identifiable unit of data.

The distribution of data across the memory servers can include interleaving the data. Data interleaving refers to interspersing portions of the data across the memory servers in some specified order or other arrangement. For example, data can be interleaved by sequentially placing the data portions across the memory servers. As an example, in an arrangement with 4 memory servers (memory servers 0 to 3), the interleaving places data portion 0 at memory server 0, places data portion 1 at memory server 1, places data portion 2 at memory server 2, places data portion 3 at memory server 3, places data portion 4 at memory server 0, places data portion 5 at memory server 2, places data portion 6 at memory server 3, and so forth. Such an interleaving arrangement can be referred to as a round robin interleaving arrangement in which sequential data portions are successively placed in memory servers according to an order of the memory servers (starting at a beginning memory server and proceeding to a last memory server in a sequence), and when the last memory server is reached in the sequence, the next data portion is placed in the beginning memory server in the sequence and the process continues until the end of the data portions is reached. Placing a data portion at a given memory server refers to writing the data portion in the main memory of the memory server.

FIG. 1 is a block diagram of an example arrangement that includes a fabric attached memory 102 including a distributed arrangement of memory servers 104 that are connected to a network 106. Client systems 108-1 to 108-N (N≥1) also are connected to the network 106. Each client system can access the fabric attached memory 102.

FIG. 1 shows an arrangement of components of the client system 108-1. The remaining client system(s) (including 108-N) may have the same arrangement of components or a different arrangement of components. The client system 108-1 includes a network interface 110 to communicate over the network 106, a processor 112 to execute machine-readable instructions (including firmware, an operating system (OS), an application program, etc.) of the client system 108-1. The client system 108-1 also includes a local memory 114 to store local data at the client system 108-1. A "processor" can include a microprocessor, a core of a multi-core microprocessor, a microcontroller, a programmable integrated circuit, a programmable gate array, or another hardware processing circuit.

Examples of client systems include any or some combination of the following: a desktop computer, a notebook computer, a tablet computer, a server computer, a smartphone, a game appliance, an Internet-of-things (IoT) device, and so forth.

A client system is an example of a "client" that can issue a request to perform a remote access of the fabric attached memory 102. A program (including machine-readable instructions) that executes in the client system 108 can be another example of a "client."

In accordance with some implementations of the present disclosure, the client system 108-1 includes a remote memory data placement management engine 116. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The remote memory data placement management engine 116 can manage the allocation of memory regions across the memory servers 104 for placing data. In addition, the remote memory data placement management engine 116 can manage the placement of data across the memory servers 104, such as by placing interleaved data in a memory region allocated across the memory servers 104.

Each memory server 104 includes a main processor 118 to execute an OS 120 of the memory server 104, as well as to execute other machine-readable instructions, such as firmware (e.g., BIOS code), application programs, and so forth. It is noted that each memory server 104 can include multiple different types of processors (including the main processor 118) to perform respective different functions. The "main processor" can include a single processor or multiple processors.

Each memory server 104 also includes a persistent memory 122 (which is the main memory of the memory server 104) that can store data on behalf of the client systems 108-1 to 108-N. A "persistent" memory refers to a memory that can maintain data stored in the memory even if power is removed from the memory. For example, persistent memory can include nonvolatile memory in which stored data is maintained (i.e., not lost) even when powered off. In another example, persistent memory can refer to an arrangement in which data of a memory is flushed to a backup storage (e.g., disk-based storage, etc.) when power is lost, followed by restoring the data from the backup storage to the memory after power is recovered.

The memory server 104 also includes a network interface 124 that enables the memory server 104 to communicate over the network 106.

In examples where a client system, such as the client system 108-1, is able to perform an RDMA access of the fabric attached memory 102, an RDMA data transfer would cause data to be transmitted from the client system over the network 106 to selected memory servers 104 of the fabric attached memory 102. The data of the RDMA data transfer would pass through the network interface 124 of each of the selected memory servers 104, and is written to the persistent memory 122 of each of the selected memory servers 104, without involving the main processor 118 of each of the selected memory servers 104. In the RDMA data transfer, processing cycles of the main processor 118 of the memory server 104 are not employed for placing the data into the persistent memory 122.

In some examples of the present disclosure, the remote memory data placement management engine 116 can identify multiple memory servers 104 accessible by the client system 108-1 to perform remote access over the network 106 of data stored by the multiple memory servers 104. The remote memory data placement management engine 116 sends allocation requests to allocate a memory region including memory segments (e.g., in which stripes of data can be contained) to place interleaved data of the client system 108-1 across the multiple memory servers 104.

The remote memory data placement management engine 116 receives, in response to the allocation requests, metadata relating to the memory region including the memory segments at the multiple memory servers 104. The metadata includes addresses of the memory segments at the multiple memory servers 104.

A program in the client system 108-1 uses the metadata to access the interleaved data at the multiple memory servers 104. In some examples, the interleaved data includes blocks of data distributed across the memory segments.

Figure 2:
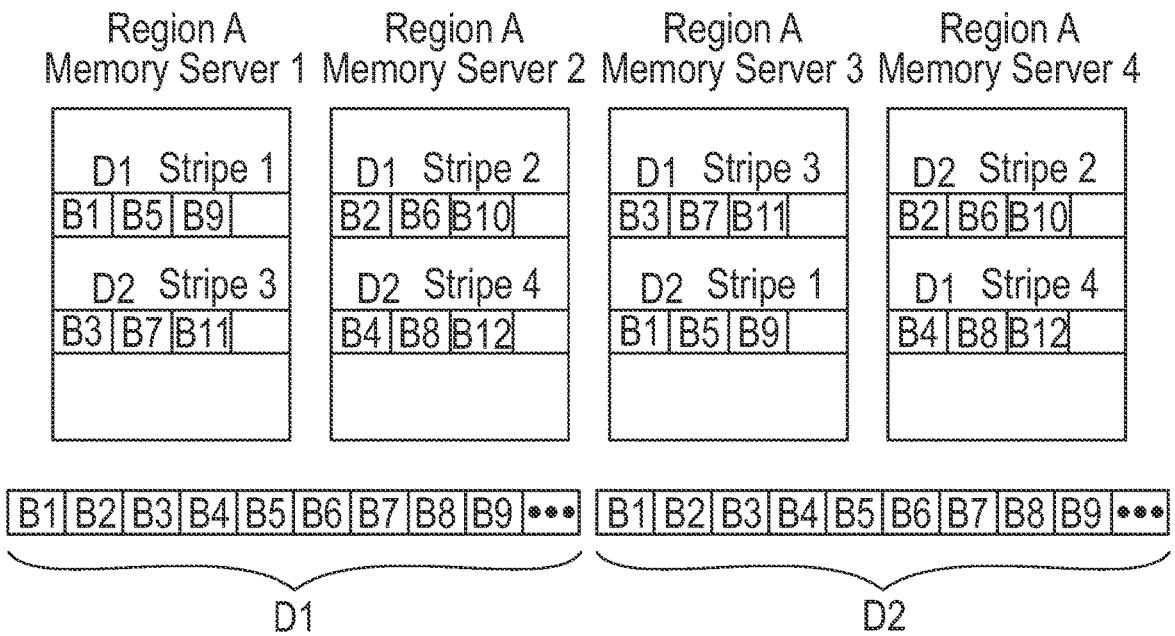
FIGS. 2 and 3 are block diagrams of interleaving data across memory servers, according to some examples.

FIG. 2 is a block diagram of an example of allocation of a memory region ("memory region A") to place interleaved data across multiple memory servers 104 (which in the example are memory servers 1, 2, 3, and 4). A "memory region" refers to an allocated amount of memory that is allocated to a client for storing data in the fabric attached memory 102.

In the example of FIG. 2, two data items D1 and D2 are stored in memory region A and distributed across memory servers 1, 2, 3, and 4. Each portion of a data item in a memory server is referred to as a stripe. In the example, data item D1 is divided into four stripes that are placed in respective memory servers 1, 2, 3, and 4. Each stripe includes a quantity of blocks of data item D1. Data item D1 includes blocks B1, B2, B3, B4, B5, B6, B7, B8, B9, and so forth, where B1 is the beginning block of data item D1. Stripe 1 (placed in memory server 1) of data item D1 includes blocks B1, B5, B9, and so forth; stripe 2 (placed in memory server 2) of data item D1 includes blocks B2, B6, B10, and so forth; stripe 3 (placed in memory server 3) of data item D1 includes blocks B3, B7, B11, and so forth; and stripe 4 (placed in memory server 4) of data item D1 includes blocks B4, B8, B12, and so forth.

Similarly, data item D2 includes blocks B1, B2, B3, B4, B5, B6, B7, B8, B9, and so forth. Stripe 1 (placed in memory server 3) of data item D2 includes blocks B1, B5, B9, and so forth; stripe 2 (placed in memory server 4) of data item D2 includes blocks B2, B6, B10, and so forth; stripe 3 (placed in memory server 1) of data item D2 includes blocks B3, B7, B11, and so forth; and stripe 4 (placed in memory server 2) of data item D2 includes blocks B4, B8, B12, and so forth.

Note that the beginning block B1 of data item D1 is placed in memory server 1, while the beginning block B1 of data item D2 is placed in a different memory server 3.

Placing the beginning blocks of different data items in different memory servers can allow for more distributed access of data of memory servers 1, 2, 3, and 4, to reduce the likelihood that any memory server becomes a bottleneck when blocks of data items D1 and D2 are accessed. For example, a client can request access of both data items D1 and D2. By placing the beginning blocks of data items D1 and D2 in different memory servers (1 and 3, respectively), the access of the data items can occur in parallel; e.g., the client can access block B1 of data item D1 at memory server 1 in parallel with accessing block B1 of data item D2 at memory server 3, so that the client is not attempting to access both block B1 of D1 and block B1 of D2 simultaneously from the same memory server, such as memory server 1.

The interleaving of data item D1 across memory servers 1, 2, 3, and 4 is accomplished by writing blocks of data item D1 in the following sequence: B1 to memory server 1, B2 to memory server 2, B3 to memory server 3, B4 to memory server 4, B5 to memory server 1, B6 to memory server 2, B7 to memory server 3, B8 to memory server 4, and so forth, in a round robin write of the blocks across memory servers 1, 2, 3, and 4.

The interleaving of data item D2 across memory servers 1, 2, 3, and 4 is accomplished by writing blocks of data item D2 in the following sequence: B1 to memory server 3, B2 to memory server 4, B3 to memory server 1, B4 to memory server 2, B5 to memory server 3, B6 to memory server 4, B7 to memory server 1, B8 to memory server 2, and so forth, in a round robin write of the blocks across memory servers 1, 2, 3, and 4.

Figure 3:
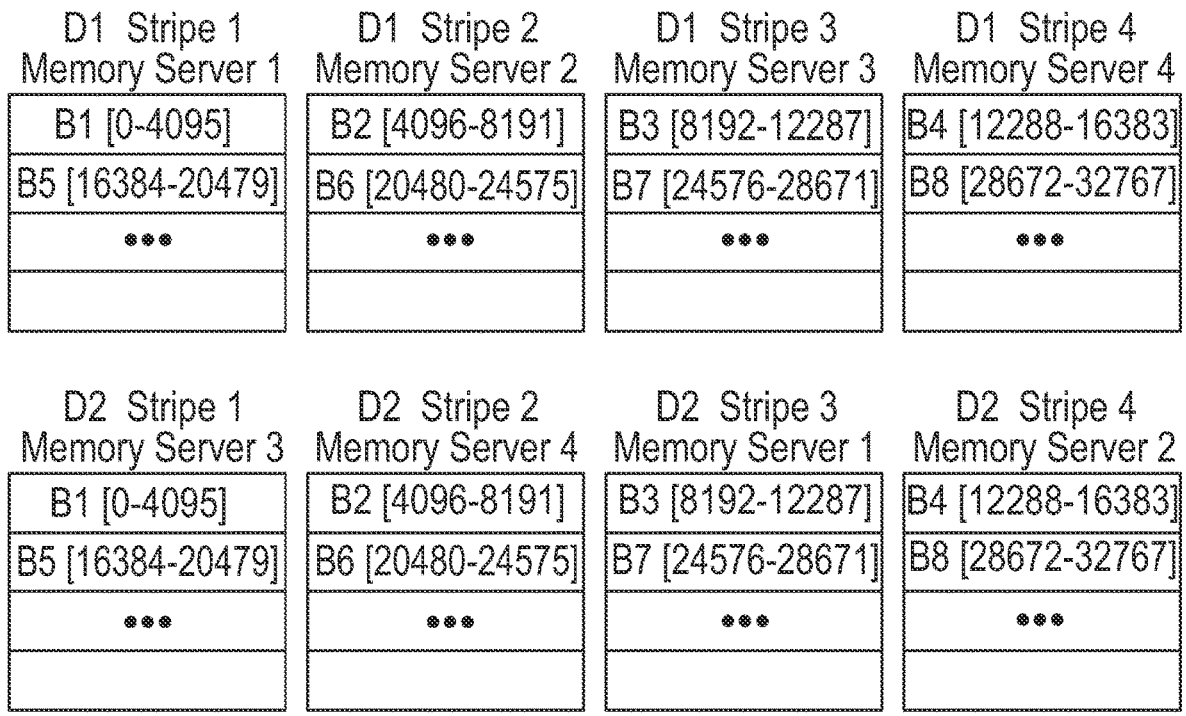

FIG. 3 is a block diagram of an example of addresses associated with blocks of data items D1 and D2 in memory servers 1, 2, 3, and 4. In the example of FIG. 3, it is assumed that an interleave size (or equivalently, block size) of each data item is 4096 bytes. In other examples, the interleave size can be different.

Memory server 1 stores blocks B1, B5, etc., of stripe 1 of data item D1, and stores blocks B3, B7, etc., of stripe 3 of data item D2. Block B1 of stripe 1 of data item D1 contains data at addresses 0-4095, and block B3 of stipe 3 of data item 2 contains data at addresses 8192-12287. In the example of FIG. 3, each address is a byte offset that identifies a respective byte in the block.

For example, in memory server 1, byte offset 0 of data item D1 identifies byte 0 in block B1 of stripe 1 of data item D1, byte offset 1 of data item D1 identifies byte 1 in block B1 of stripe 1 of data item D1, . . . , and byte offset 4095 of data item D1 identifies byte 4095 in block B1 of stripe 1 of data item D1.

Similarly, in memory server 1, byte offset 8192 of data item D2 identifies byte 0 in block B3 of stripe 3 of data item D2, byte offset 8193 of data item D2 identifies byte 1 in block B3 of stripe 3 of data item D2, . . . , and byte offset 12287 of data item D2 identifies byte 4095 in block B3 of stripe 3 of data item D2.

Figure 4:
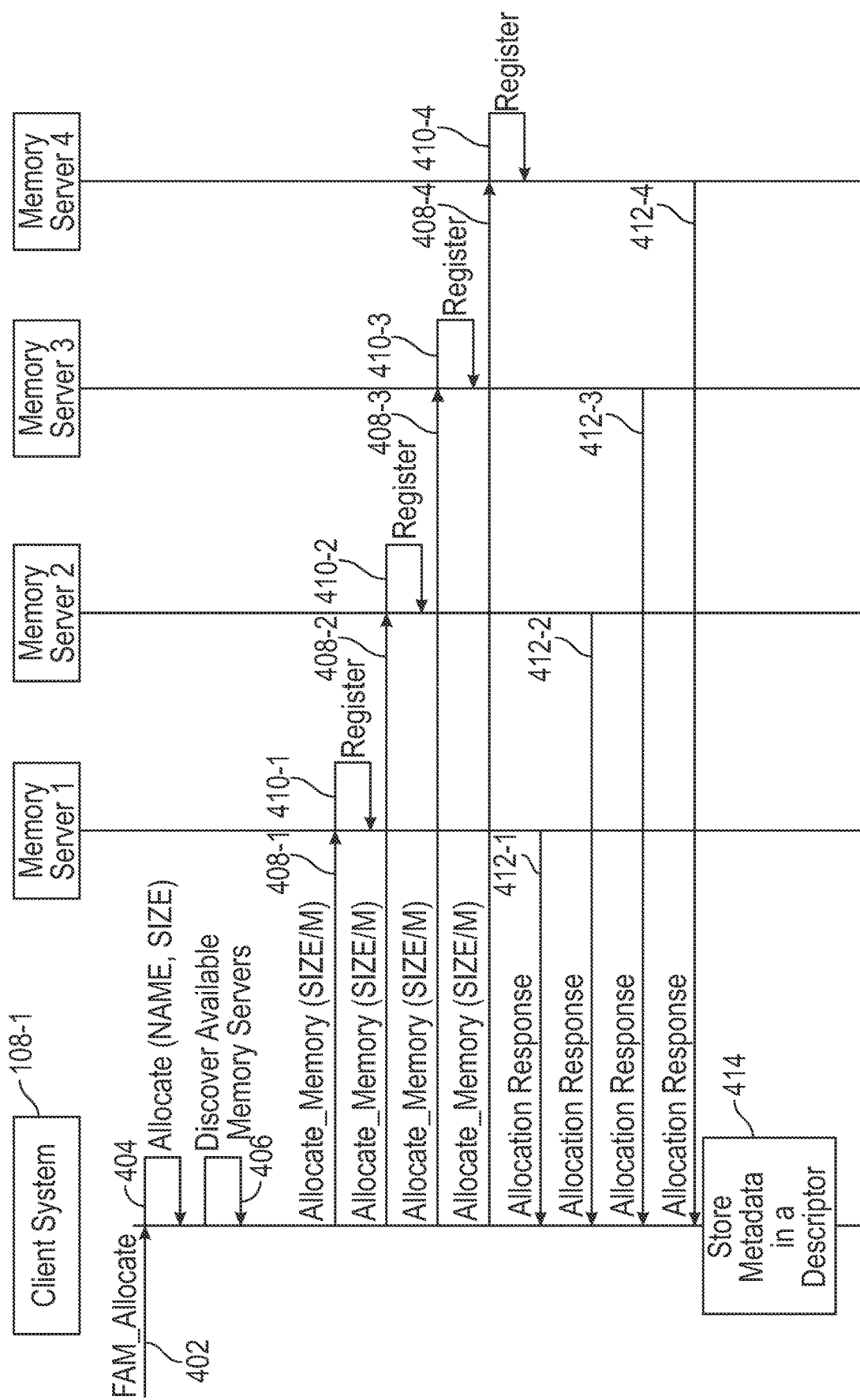
FIG. 4 is a message flow diagram of a process of a client system and memory servers, according to some examples.

FIG. 4 is a message flow diagram of a process involving the client system 108-1 and memory servers 1, 2, 3, and 4 that can be performed in some examples.

The client system 108-1 receives (at 402) a FAM_Allocate request, which is a request to allocate a memory region at the fabric attached memory 102 that includes multiple memory servers, including memory servers 1, 2, 3, and 4. The FAM_Allocate request may be issued in response to a request by a program in the client system 108-1, or a request from a requester that is external of the client system 108-1. The FAM_Allocate request may specify a size of the memory region to be allocated. In some examples, the FAM_Allocate request may be triggered based on a program or another requester accessing an application programming interface (API) that provides routines for memory allocation and for other functionalities relating to the fabric attached memory 102.

In response to the FAM_Allocate request, the client system 108-1 issues (at 404) an Allocate(NAME, SIZE) command, which is a command to allocate a memory region with an identifier specified by NAME, and having a size specified by SIZE.

The client system 108-1 also discovers (at 406) available memory servers at which the memory region can be allocated. In some examples, the client system 108-1 can interact with a metadata server 130 (FIG. 1) to discover the available memory servers. The metadata server 130 may be a server computer that maintains information of a collection of memory servers of the fabric attached memory 102. The information maintained can include any or some combination of the following: information to available memory capacity of each memory server (which indicates how much storage capacity is available to store data in the persistent memory of the memory server), information pertaining to a health status of each memory server (e.g., relating to error rates and any failures encountered by the memory server), information pertaining to data rates of each memory server (e.g., relating to how fast data can be written or read from the memory server), and so forth.

The client system 108-1 can send a request to the metadata server 130 that specifies that a memory region of a specified size (SIZE) is to be allocated. The metadata server 130 can use its information to identify which memory server(s) of the collection of metadata servers has sufficient capacity to store at least a portion of the memory region. The metadata server 130 can return a list of the identified memory server(s) to the client system 108-1. In the example of FIG. 4, it is assumed that the list returned by the metadata server 130 identifies memory servers 1, 2, 3, and 4 (i.e., the list includes identifiers of memory servers 1, 2, 3, and 4).

In response to the list from the metadata server 130, the client system 108-1 issues Allocate_Memory(SIZE/M) requests to allocate the memory region (with size specified by SIZE) across the memory servers in the list, which in the example are memory servers 1, 2, 3, and 4 (and thus M=4).

The client system 108-1 sends (at 408-1) an Allocate_Memory(SIZE/M) request to memory server 1, sends (at 408-2) an Allocate_Memory(SIZE/M) request to memory server 2, sends (at 408-3) an Allocate_Memory(SIZE/M) request to memory server 3, and sends (at 408-4) an Allocate_Memory(SIZE/M) request to memory server 4. Each Allocate_Memory(SIZE/M) request may be issued to the metadata server 130, which forwards the Allocate_Memory (SIZE/M) request to the respective memory server. Alternatively, the client system 108-1 can send each Allocate_Memory(SIZE/M) request directly to the respective memory server.

In other examples, instead of sending four separate Allocate_Memory(SIZE/M) requests, one Allocate_Memory (SIZE/M) request can be multicast to memory servers 1, 2, 3, and 4, either directly or through the metadata server 130.

According to the example of FIG. 4, memory server 1 registers (at 410-1) a first segment of the memory region at memory server 1 in response to the Allocate_Memory(SIZE/M) request sent (at 408-1), memory server 2 registers (at 410-2) a second segment of the memory region at memory server 2 in response to the Allocate_Memory(SIZE/M) request sent (at 408-2), memory server 3 registers (at 410-3) a third segment of the memory region at memory server 3 in response to the Allocate_Memory(SIZE/M) request sent (at 408-3), and memory server 4 registers (at 410-4) a fourth segment of the memory region at memory server 4 in response to the Allocate_Memory(SIZE/M) request sent (at 408-4).

In some examples, each memory server can register the respective segment of the memory region by invoking a library routine in a libfabric library, which is an open source library that supports various functionalities, including defining memory for use by a client. In other examples, each can register the respective segment of the memory region using a different mechanism.

Additionally, memory server 1 sends (at 412-1) an allocation response to the client system 108-1 (either directly or through the metadata server 130), memory server 2 sends (at 412-2) an allocation response to the client system 108-1 (either directly or through the metadata server 130), memory server 3 sends (at 412-3) an allocation response to the client system 108-1 (either directly or through the metadata server 130), and memory server 4 sends (at 412-4) an allocation response to the client system 108-1 (either directly or through the metadata server 130). Each allocation response includes status information (to indicate whether the allocation of the respective segment of the memory region was successful or failed), a key, and a respective base address.

The key can be a value (such as a number, a character string, etc.) that a client system can use to perform an operation on the allocated segment of the memory region at the respective memory server. The key is a tag that is recognized at a memory server (such as by the libfabric library at the memory server) as associated with the segment of the memory region.

The base address refers to an address (e.g., a virtual address) that is a beginning address of the allocated segment of the memory region at the respective memory server.

The information returned in the allocation responses from memory servers 1, 2, 3, and 4 constitutes metadata that can be used at the client system 108-1 to access the allocated memory region segments. The client system 108-1 stores (at 414) the received metadata contained in the allocation responses in a descriptor that can be stored at the client system 108-1 (such as in the local memory 114 shown in FIG. 1).

Figure 5:
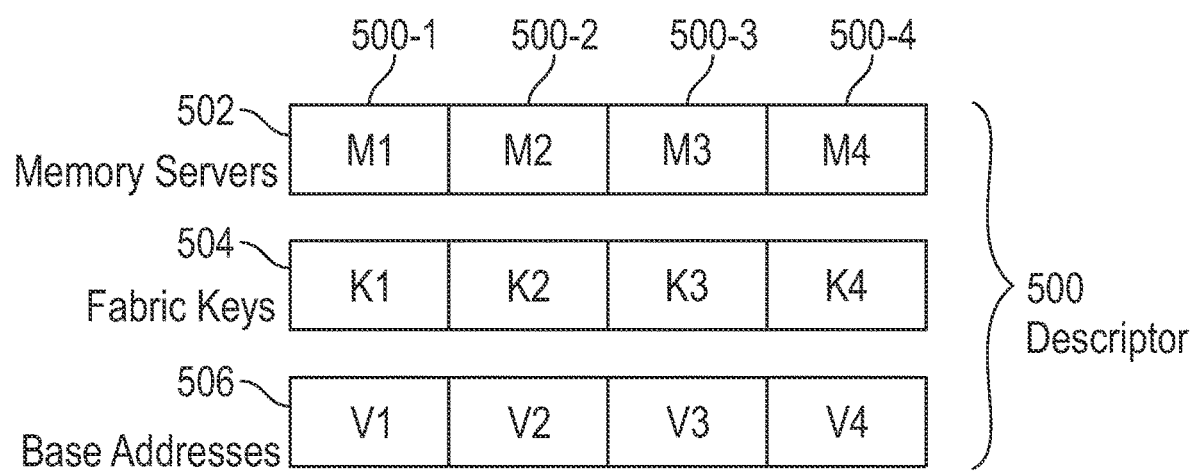
FIG. 5 is a block diagram of a descriptor including metadata according to some examples.

FIG. 5 is a block diagram of a descriptor 500 that can store the metadata noted above. The descriptor 500 is a data structure that can have any of various formats, such as in the form of a table, a file, and so forth. The descriptor may be stored in the local memory 114 of the client system 108-1 of FIG. 1, for example.

The descriptor 500 includes four entries 500-1, 500-2, 500-3, and 500-4 (in the example where there are four memory servers as shown in FIG. 4). The entry 500-1 includes an identifier M1 of memory server 1, a key K1 for the allocated segment of the memory region at memory server 1, and a base address V1 of the allocated segment of the memory region at memory server 1.

The entry 500-2 includes an identifier M2 of memory server 2, a key K2 for the allocated segment of the memory region at memory server 2, and a base address V2 of the allocated segment of the memory region at memory server 2.

The entry 500-3 includes an identifier M3 of memory server 3, a key K3 for the allocated segment of the memory region at memory server 3, and a base address V3 of the allocated segment of the memory region at memory server 3.

The entry 500-4 includes an identifier M4 of memory server 4, a key K4 for the allocated segment of the memory region at memory server 4, and a base address V4 of the allocated segment of the memory region at memory server 4.

The descriptor 500 includes a memory servers list 502 at which a memory region is allocated, a fabric keys list 504 for corresponding memory region segments, and a base addresses list 506 for the corresponding memory region segments.

Each memory region segment at a memory server that is allocated can be used to store a respective stripe of a data item. For example, in FIG. 2, the allocated segment of memory region A in memory server 1 stores stripe 1 of data item D1 and stripe 3 of data item D2, the allocated segment of memory region A in memory server 2 stores stripe 2 of data item D1 and stripe 4 of data item D2, the allocated segment of memory region A in memory server 3 stores stripe 3 of data item D1 and stripe 1 of data item D2, and the allocated segment of memory region A in memory server 4 stores stripe 4 of data item D1 and stripe 2 of data item D2.

Once a memory region is allocated across memory servers for a given data item, when any offset within the given data item is accessed (read and/or written), the client system 108-1 can derive the memory server identifier (e.g., any of M1 to M4 in the example of FIG. 5) and a byte offset within the corresponding stripe of the given data item, based on the interleave size and the quantity of memory servers across which the memory region is allocated.

Hence, for a given read/write operation that specifies an offset and the data size (e.g., quantity of bytes) to access, the list of memory servers where the corresponding remote access operations are to be performed as well as the data size of each remote access operation at each memory server can be calculated by the client system 108-1.

Based on the information specified in the given read/write operation and the metadata stored in a descriptor (e.g., 500 in FIG. 5), interleaving can be handled remotely from the client system 108-1 without additional intervention or coordination by a central controller or any of the memory servers.

Figure 6:
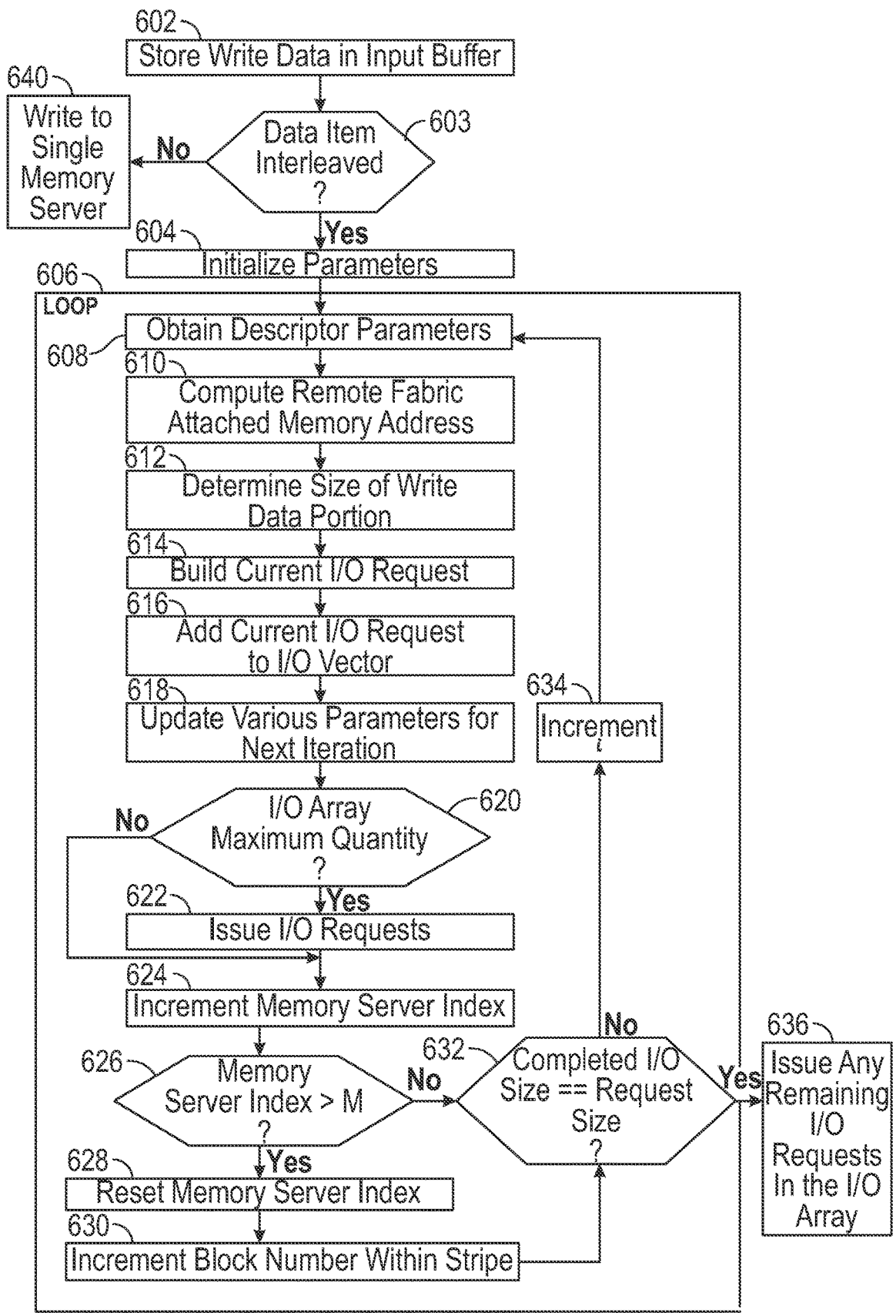
FIG. 6 is a flow diagram of a process of a client system to write data of a specified size to a fabric attached memory, according to some examples.

FIG. 6 refers to an example in which a data item that is 1 gigabyte (1 GB) in size is spread across four memory servers within an interleave size (or equivalently block size) of 1 megabyte (MB). In an example, the client system 108-1 can receive a write request to perform a write operation of data (having a data size of 2 MB) to the fabric attached memory 102. In the example, the write request specifies that the write data is to be written to offset 256 (i.e., byte 256) within the data item.

Although FIG. 6 depicts a specific order of tasks, it is noted that in other examples the tasks can be performed in a different order, and/or some tasks may be omitted, and/or other tasks may be added.

The client system 108-1 stores (at 602) the write data for the write request in an input buffer 140 (FIG. 1) of the client system 108-1. The client system 108-1 is to retrieve portions of the write data from the input buffer 140 for writing to the memory servers. In an example, it is assumed there are M (=4) memory servers across which the write data is to be interleaved.

The client system 108-1 determines (at 603) if the data item to which the write request is directed is interleaved across multiple memory servers. If the data item is not interleaved (which means the data item is stored in just one memory server), the client system 108-1 proceeds (at 640) with a write request to a single memory server.

The following refers to tasks performed in response to the client system 108-1 determining (at 603) that the data item is interleaved.

The client system 108-1 initializes (at 604) various parameters relating to a memory server, a stripe, a block, and a location in the input buffer 140. The parameters initialized are as follows.

A memory server index, MEMORY_SERVER_INDEX, is initialized to refer to a memory server (of the M memory servers) that the write operation is to start at.

MEMORY_SERVER_INDEX =

(OFFSET/INTERLEAVE_SIZE)% $M$ = (256/1048576)% 4 = 0.

In the above calculation, the operator "%" is a modulo operator, which returns the remainder of the division of (OFFSET/INTERLEAVE_SIZE) divided by M. The parameter OFFSET represents the offset of the write operation (which in the above example is 256). The parameter INTERLEAVE_SIZE represents the interleave size (which in the above example is 1 MB or 1,048,576 bytes).

Note that if the value of OFFSET is greater than 1 MB, then the MEMORY_SERVER_INDEX would be set to a value of 1 or greater to refer to another memory server of the M memory servers.

A block number within stripe, BLOCK_NUM_WITHIN_STRIPE, is initialized to refer to a block number within a stripe at the memory server that the write operation is to start at:

BLOCK_NUM_WITHIN_STRIPE =

((OFFSET/INTERLEAVE_SIZE − MEMORY_SERVER_INDEX))/$M$ =

((256/1048576) − 0)/4 = 0.

An offset within block value, OFFSET_WITHIN_BLOCK, is initialized to refer to an offset within a block identified by BLOCK_NUM_WITHIN_STRIPE at which the write is to start at:

OFFSET_WITHIN_BLOCK =

OFFSET % INTERLEAVE_SIZE = 256 % 1048576 = 256.

A buffer pointer, BUFFER_POINTER, is set to the value of INPUT_BUFFER, which contains the pointer to where the write data for the write request starts in the input buffer 140 of the client system 108-1. In the example below, it is assumed that INPUT_BUFFER is set to 1000, which refers to the 1000th byte in the input buffer 140, for example.

BUFFER_POINTER = INPUT_BUFFER = 1000.

After the foregoing parameters are initialized, a loop 606 can be performed to create I/O requests that are to be submitted to the fabric attached memory 102 to perform the write operation specified by the write request. The I/O requests are created one at a time in the loop 606. As discussed further below further in connection with FIG. 7, the created I/O requests are placed into I/O request data structures for the respective M memory servers (e.g., one I/O request data structure, such as a vector, per memory server). Each I/O request is to write a portion of the write data to the fabric attached memory 102.

Each iteration of the loop 606 creates a "current" I/O request, low, where i represents the current iteration of the loop 606. Additional iterations of the loop 606 create other I/O requests.

The loop 606 includes obtaining (at 608) several descriptor parameters from the descriptor 500, including a memory server identifier (MEMORY_SERVER_ID), a key (KEY) for accessing the memory region segment, and a base address (BASE_ADDRESS) of the memory region segment that is to be accessed for the write operation. The memory server index, MEMORY_SERVER_INDEX, is used to lookup the respective entry (e.g., one of entries 500-1 to 500-4) of the descriptor 500 of FIG. 5, as follows:

MEMORY_SERVER_ID =

MEMORY_SERVERS[MEMORY_SERVER_INDEX] = 0.

KEY = FABRIC_KEYS[MEMORY_SERVER_INDEX] = 10.

BASE_ADDRESS =

BASE_ADDRESS_LIST[MEMORY_SERVER_INDEX] = 100.

In the above, MEMORY SERVERS[ ] is the memory servers list 502, FABRIC_KEYS[ ] is the fabric keys list 504, and BASE_ADDRESS_LIST[ ] is the base addresses list 506.

Next, using the base address (BASE_ADDRESS) obtained from the descriptor 500 using the memory server index, MEMORY_SERVER_INDEX, the client system 108-1 computes (at 610) a remote fabric attached memory address (REMOTE_FAM_POINTER), which is the address at which the current I/O request, low, is to write the respective write data portion.

REMOTE_FAM_POINTER =

(BLOCK_NUM_WITHIN_STRIPE * INTERLEAVE_SIZE) +

OFFSET_WITHIN_BLOCK + BASE_ADDRESS =

(0 * 1048576 + 256 + 100 = 356.

Next, the client system 108-1 determines (at 612) a size (DATA_CHUNK_SIZE) of the write data portion for the current I/O request, low, as follows:

DATA_CHUNK_SIZE = MIN(INTERLEAVE_SIZE, REQUEST_SIZE −

COMPLETED_IO_SIZE) − OFFSET_WITHIN_BLOCK =

MIN(1048576, 2097152 − 0) − 256 = 1048320.

The size of the write data portion for the current I/O request, low, is the minimum of the interleave size and the difference between the write request size (REQUEST_SIZE) and the overall completed I/O size (COMPLETED_IO_SIZE) of the write data portions of the I/O request(s), if any, already created in the loop 606, less OFFSET_WITHIN_BLOCK.

The write request size (REQUEST_SIZE) is the size of the write data specified by the write request, which in the present example is 2 MB (or 2,097,152 bytes). The overall completed I/O size (COMPLETED_IO_SIZE) of the write data portions of the I/O request(s), if any, already created in the loop 606 is the sum of the sizes of the write data portions of the I/O request(s), if any, already created in the loop 606.

The value of OFFSET_WITHIN_BLOCK is subtracted from the minimum of the interleave size and the difference between the write request size (REQUEST_SIZE) and the overall completed I/O size (COMPLETED_IO_SIZE) since for the first block written, the write may start at a non-zero byte represented by OFFSET_WITHIN_BLOCK.

The client system 108-1 then builds (at 614) the current I/O request, IO(i), for the current iteration i of the loop 606, represented as:

IO(i) = {KEY, REMOTE_FAM_POINTER, BUFFER_POINTER,

DATA_CHUNK_SIZE} = {10, 256, 1000, 1048320}.

The current I/O request, low, includes the key (KEY) used to access the corresponding memory region segment, the remote fabric attached memory address (REMOTE_FAM_POINTER) that is the address at which the current I/O request is to write the respective write data portion, the buffer pointer (BUFFER_POINTER) that refers to where the write data for the write request starts in the input buffer 140 of the client system 108-1, and the size (DATA_CHUNK_SIZE) of the write data portion for the current I/O request.

Figure 7:
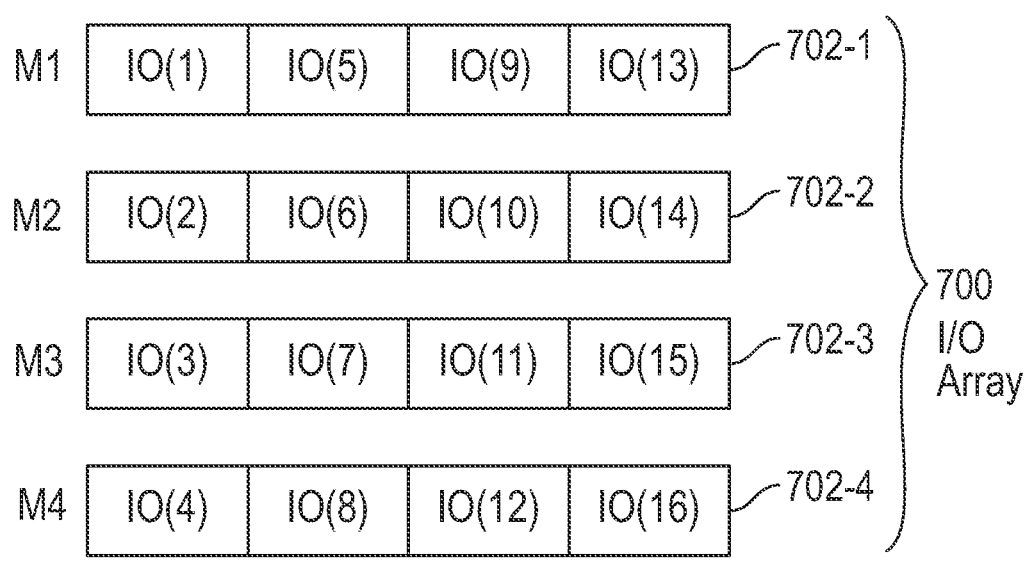
FIG. 7 is a block diagram of an input/output (I/O) array including I/O vectors to store I/O requests, according to some examples.

The client system 108-1 adds (at 616) the current I/O request, low, to a corresponding I/O request data structure (e.g., I/O vector) for the memory server having memory server identifier, MEMORY_SERVER_ID. FIG. 7 shows I/O vectors 702-1, 702-2, 702-3, and 702-4 for the four respective memory servers having memory server identifiers M1, M2, M3, and M4. Collectively, the I/O vectors 702-1, 702-2, 702-3, and 702-4 form an I/O array 700 containing I/O requests that are to be submitted to the fabric attached memory 102 for writing the write data of the write request.

The I/O vector 702-1 contains I/O requests for the memory server having memory server identifier M1, the I/O vector 702-2 contains I/O requests for the memory server having memory server identifier M2, the I/O vector 702-3 contains I/O requests for the memory server having memory server identifier M3, and the I/O vector 702-4 contains I/O requests for the memory server having memory server identifier M4.

Although the example of FIG. 7 shows each I/O vector with a depth of 4, in other example, each I/O vector can have a smaller or greater depth.

Assuming the loop 606 is in a first iteration where i=1, and MEMORY_SERVER_ID=M1, then IO(1) is added to the first entry of the I/O vector 702-1.

The client system 108-1 updates (at 618) various parameters to prepare for the next iteration, as discussed below.

The client system 108-1 increments the buffer pointer (BUFFER_POINTER) before the next iteration, as follows:

BUFFER_POINTER =

BUFFER_POINTER + DATA_CHUNK_SIZE = 1000 + 256 = 1256.

The buffer pointer (BUFFER_POINTER) is incremented by the size (DATA_CHUNK_SIZE) of the write data portion for the I/O request, low, that was added to the I/O array 700.

The client system 108-1 increments the overall completed I/O size (COMPLETED_IO_SIZE) of the write data portions of the I/O request(s) by adding DATA_CHUNK_SIZE, as follows:

COMPLETED_IO_SIZE =

COMPLETED_IO_SIZE + DATA_CHUNK_SIZE =

0 + 1048320 = 1048320.

Stated differently, COMPLETED_IO_SIZE is incremented to add the size of the write data portion of the current I/O request, low.

The client system 108-1 resets OFFSET_WITHIN_BLOCK to zero (OFFSET_WITHIN_BLOCK=0). This is to indicate that the next write (of the I/O request to be built in the next iteration) is of a block starting at offset 0.

The client system 108-1 determines (at 620) whether a quantity of entries of the I/O array 700 is greater than a specified maximum quantity of entries, MAX_SCATTER_SIZE. In some examples, the check at 620 is performed to prevent the I/O array 700 from becoming too large (i.e., from containing too many I/O requests that have not yet been issued). If the quantity of entries of the I/O array 700 is greater than the specified maximum quantity of entries, MAX_SCATTER_SIZE, then the client system 108-1 issues (at 622) the I/O requests of the I/O array 700 over the network 106 to the fabric attached memory 102. The I/O requests can be issued in a scatter I/O operation, in which the I/O requests are issued in parallel to multiple memory servers. The issued I/O requests are removed from the I/O array 700.

If the quantity of entries of the I/O array 700 is greater than the specified maximum quantity of entries, MAX_SCATTER_SIZE, then the loop 606 continues to add to the I/O array 700.

The client system 108-1 increments (at 624) MEMORY_SERVER_INDEX to refer to the next memory server. Note that since there are M (e.g., 4) memory servers in the present example, if the client system 108-1 determines (at 626) that MEMORY_SERVER_INDEX greater than M after the incrementing (at 626), then the client system 108-1 resets (at 628) MEMORY_SERVER_INDEX to 1, to go through the memory servers again in a round robin fashion. Also, if MEMORY_SERVER_INDEX is greater than M, the client system 108-1 increments (at 630) the block number within stripe, BLOCK_NUM_WITHIN_STRIPE, to refer to the next block to be accessed in the next iteration. In other words, after I/O requests for all M memory servers have been created in one round, the block number within stripe is incremented to refer to the next block.

The client system 108-1 determines (at 632) whether COMPLETED_IO_SIZE is equal to the write request size, REQUEST_SIZE, which is the size of the write data specified by the write request (e.g., 2 MB in the present example). If not, the loop 606 continues with the next iteration by incrementing (at 634) i, to build the next I/O request, IO(i).

If COMPLETED_IO_SIZE is equal to the write request size, REQUEST_SIZE, then the client system 108-1 issues (at 636) any remaining I/O requests in the I/O array 700 in a scatter I/O operation.

Collecting I/O requests built in the loop 606 in the I/O array 700 allows for I/O requests for each memory server to be collected into a respective I/O vector 702-j (j=1 to 4 in the present example). By collecting the I/O requests built in the loop 606 in the I/O array 700 rather than issuing the I/O requests as they are created, the quantity of I/O operations over the network 106 can be reduced by gathering I/O requests for the same server together in one I/O operation (rather than in multiple I/O operations). Moreover, the I/O operations to the different memory servers corresponding to the I/O requests in the I/O vectors 702-1 to 702-4 can be issued in parallel for better bandwidth. Each I/O operation into which the I/O requests of a respective I/O vector are gathered performs a write of respective write data portions of the I/O requests of the respective I/O vector.

Figure 8:
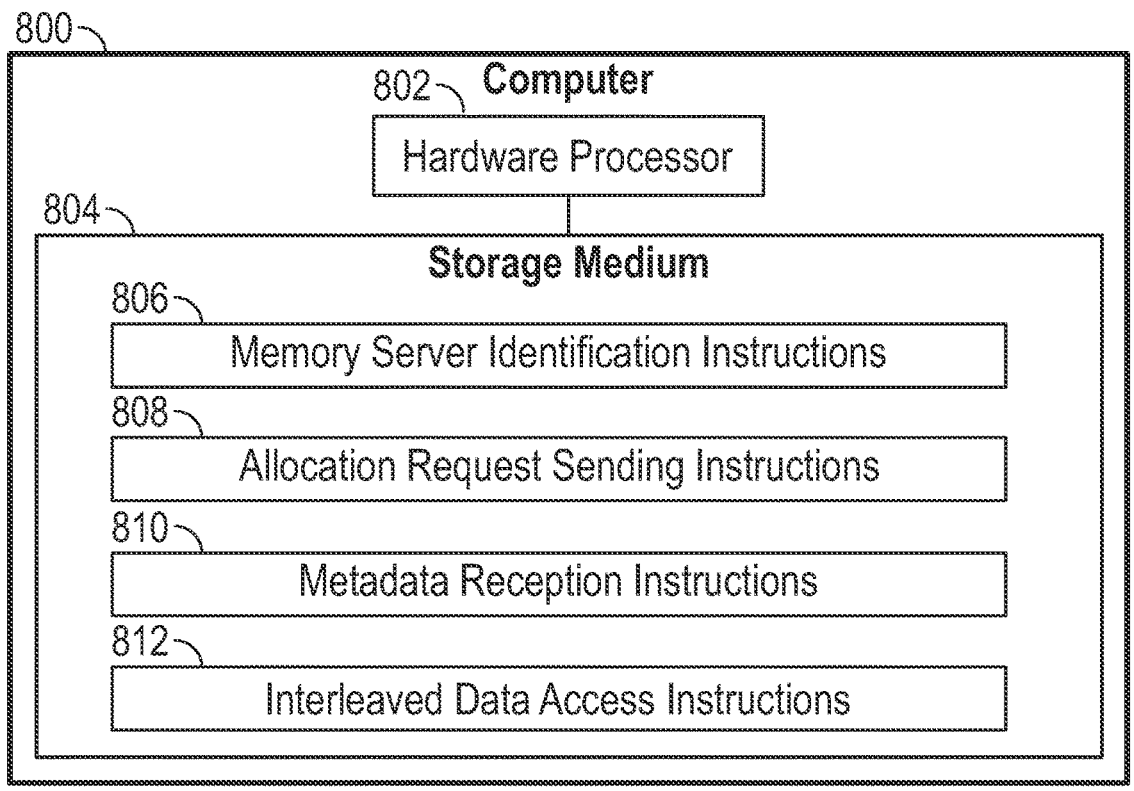
FIG. 8 is a block diagram of a computer according to some examples.

FIG. 8 is a block diagram of a computer 800 according to some examples. The computer 800 can be a client system (e.g., 108-1 to 108-N), for example.

The computer 800 includes a hardware processor 802 (or multiple hardware processors). A hardware processor performing a task can refer to a single hardware processor performing the task or multiple hardware processors performing the task.

The computer 800 includes a non-transitory or computer-readable storage medium 804 storing client instructions executable on the hardware processor 802 to perform various tasks. Machine-readable instructions executable on a hardware processor can refer to the instructions executable on a single hardware processor or the instructions executable on multiple hardware processors.

The client instructions include memory server identification instructions 806 to identify a plurality of memory servers accessible by the computer 800 to perform remote access over a network of data stored by the plurality of memory servers. The plurality of memory servers can include the memory servers 104 of FIG. 1, for example. As an example, the identification of the plurality of memory servers can be performed by the discovery task 406 in FIG. 4.

The client instructions include allocation request sending instructions 808 to send allocation requests to allocate memory segments to place interleaved data of the computer 800 across the plurality of memory servers. The allocation requests can include the Allocate_Memory(SIZE/M) requests sent at 408-1 to 408-4, for example. The memory segments can include segments of a memory region, such as memory region A shown in FIG. 2.

The client instructions include metadata reception instructions 810 to receive, at the computer 800 in response to the allocation requests, metadata relating to the memory segments at the plurality of memory servers, the metadata including addresses of the memory segments at the plurality of memory servers. For example, the metadata can be included in the allocation responses sent at 412-1 to 412-2 in FIG. 4, and can include the metadata stored in the descriptor 500 of FIG. 5, for example.

The client instructions include interleaved data access instructions 812 to use the metadata to access, by the computer 800, the interleaved data at the plurality of memory servers, the interleaved data including blocks of data distributed across the memory segments. The blocks of data can include blocks B1, B2, etc., of a data item, such as data item D1 or D2 in FIG. 2.

In some examples, the client instructions store the metadata in a descriptor (e.g., 500 in FIG. 5) in a memory (e.g., 114 in FIG. 1) of the computer 800. The client instructions access the descriptor to determine an address offset (e.g., REMOTE_FAM_POINTER) for a collection of blocks of data (a single block of data or multiple blocks of data) to be accessed by the computer 800.

In some examples, the client instructions access the descriptor to determine an identifier (MEMORY_SERVER_ID) of a memory server at which the collection of blocks of data is placed.

In some examples, each block of data has an interleave size. The determining of the address offset for the collection of blocks of data is based on the metadata in the descriptor and the interleave size.

In some examples, the client instructions distribute the blocks of data across the memory segments in a round-robin manner to provide the interleaved data.

In some examples, the interleaving of data across the memory segments at the plurality of memory servers is controlled by the client instructions without coordination of a central controller.

In some examples, the memory segments allocated are for a first data item and a second data item (e.g., D1 and D2 in FIG. 2). The client instructions place first interleaved data of the first data item across the memory segments, and place second interleaved data of the second data item across the memory segments. Each of the first interleaved data and the second interleaved data includes blocks of data distributed across the memory segments, where a beginning block of the first data item is at a first memory server, and a beginning block of the second data item is at a different second memory server (e.g., the beginning block of D1 is at memory server 1, and the beginning block of D2 is at memory server 3 in FIG. 2).

In some examples, the client instructions receive a request to write data, determine respective blocks of data to be written to each respective memory server of the plurality of memory servers, and gather I/O requests for the respective blocks of data into a respective I/O request data structure (e.g. I/O vector shown in FIG. 7) for the respective memory server at the computer 800.

In some examples, the gathering produces I/O requests in a plurality of I/O request data structures (e.g., 702-1 to 702-4 in FIG. 7) at the computer 800, where each I/O request data structure of the plurality of I/O request data structures includes I/O requests for a corresponding memory server. The client instructions issue the I/O requests in the plurality of I/O request data structure as scatter I/O operations that are issued in parallel to the plurality of memory servers.

In some examples, the scatter I/O operations include first I/O requests issued to a first memory server of the plurality of memory servers, and second I/O requests issued, in parallel, to a second memory server of the plurality of memory servers.

In some examples, the client instructions iteratively create the I/O requests in a loop (e.g., 606 in FIG. 6), where a first I/O request created in a first iteration of the loop is for a first memory server, and a second I/O request created in a second iteration of the loop is for a second memory server, and where the second iteration immediately follows the first iteration in the loop. For example, if the first I/O request is created in iteration m in the loop 606, then the second I/O request is created in iteration m+1 in the loop 606.

In some examples, each corresponding I/O request of the I/O requests includes an address (e.g., REMOTE_FAM_POINTER) at which a write data portion is to be written for the corresponding I/O request, a location (e.g., BUFFER_POINTER) in an input buffer (e.g., 140 in FIG. 1) where the write data portion is stored, and a size (DATA_CHUNK_SIZE) of the write data portion.

In some examples, the client instructions receive a request to allocate a memory region of a specified size, and generate the allocation requests in response to the request to allocate the memory region.

In some examples, in response to the request to allocate the memory region, the client instructions discover which memory servers of a collection of memory servers are available according to a criterion for allocation of the memory region. The discovering identifies the plurality of memory servers.

In some examples, the criterion is a memory capacity criterion, wherein the plurality of memory servers are memory servers with available memory capacity that satisfies the memory capacity criterion.

Figure 9:
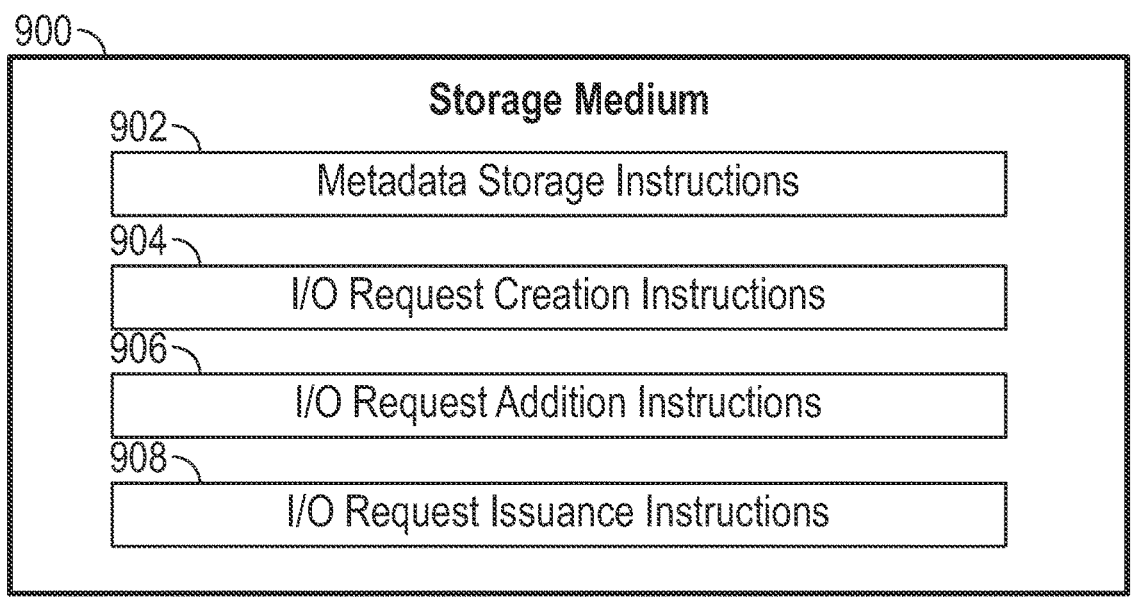
FIG. 9 is a block diagram of a storage medium storing machine-readable instructions according to some examples.

FIG. 9 is a block diagram of a non-transitory machine-readable or computer-readable storage medium 900 storing machine-readable instructions that upon execution cause a computer to perform various tasks.

The machine-readable instructions in the storage medium 900 include metadata storage instructions 902 to store, in a memory of the computer, metadata containing identifiers of memory servers across which interleaved data is placed, and base addresses of memory region segments that contain the interleaved data. The metadata can be stored in the descriptor 500 of FIG. 5, for example. The memory servers are part of a fabric attached memory (e.g., the fabric attached memory 102 of FIG. 1).

The machine-readable instructions in the storage medium 900 include I/O request creation instructions 904 to, using the metadata stored in the memory, create I/O requests for respective blocks of data of the interleaved data. The creation of a first I/O request of the I/O requests includes retrieving a first base address (e.g., any of V1 to V4 shown in FIG. 4) of the base addresses in the metadata, determining, using the first base address and an interleave size of the interleaved data, a fabric address (e.g., REMOTE_FAM_POINTER) of a first data portion of the first I/O request, and including, in the first I/O request, the fabric address.

The machine-readable instructions in the storage medium 900 include I/O request addition instructions 906 to add the I/O requests into respective I/O request data structures (e.g., I/O vectors 702-1 to 702-4) for the memory servers.

The machine-readable instructions in the storage medium 900 include I/O request issuance instructions 908 to issue the I/O requests from the I/O request data structures to the fabric attached memory, where I/O requests of a first I/O request data structure of the I/O request data structures are issued to a first memory server in parallel with I/O requests of a second I/O request data structure of the I/O request data structures issued to a second memory server.

In some examples, the I/O requests of the first I/O request data structure are gathered into a first I/O operation to the first memory server, and the I/O requests of the second I/O request data structure are gathered into a second I/O operation to the second memory server.

Figure 10:
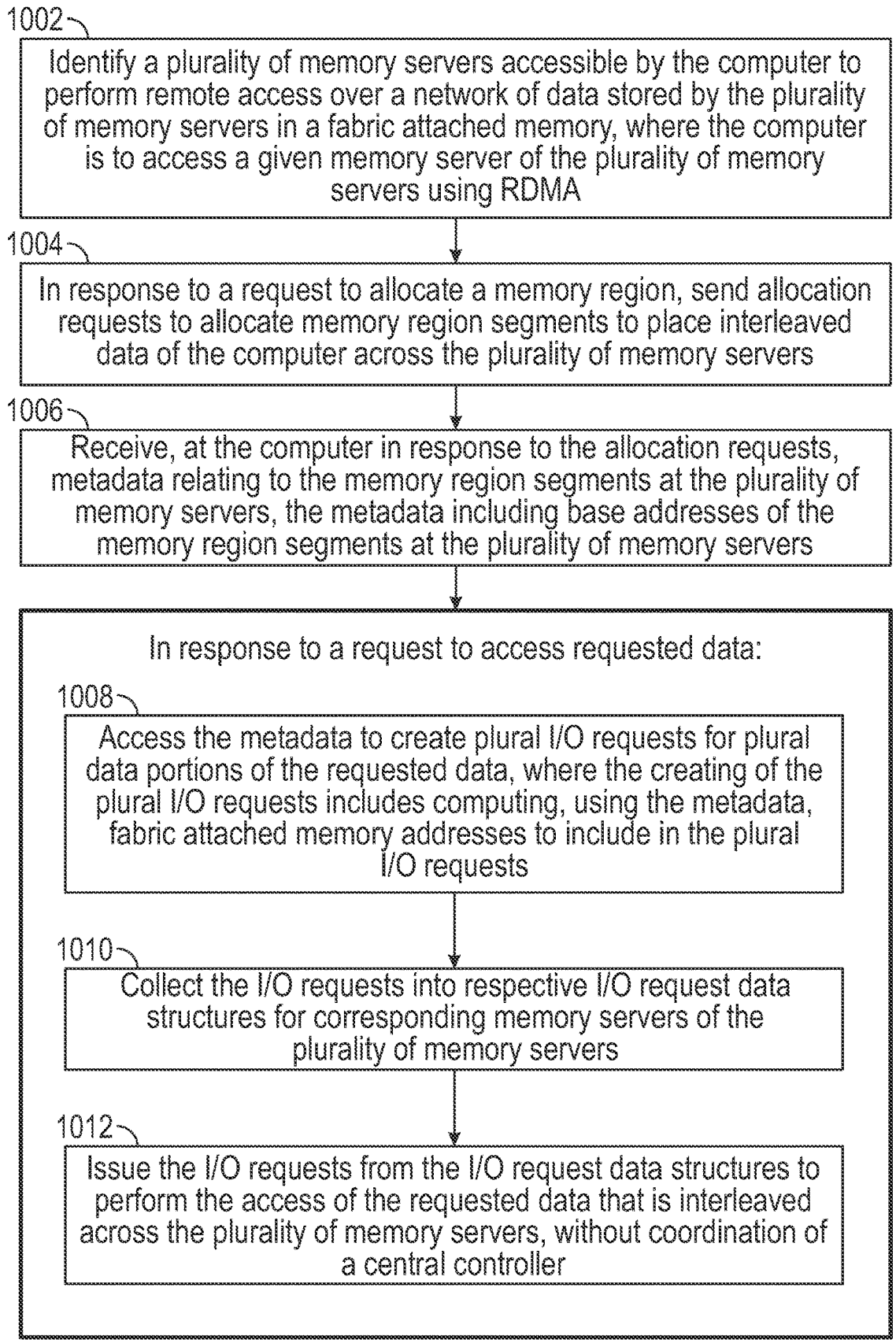
FIG. 10 is a flow diagram of a process according to some examples.

FIG. 10 is a flow diagram of a process, which can be performed by a computer, for example.

The process includes identifying (at 1002) a plurality of memory servers accessible by the computer to perform remote access over a network of data stored by the plurality of memory servers in a fabric attached memory, where the computer is to access a given memory server of the plurality of memory servers using RDMA including a transfer of data through a network interface of the given memory server where the transfer of data does not involve work performed by a main processor that executes an OS in the given memory server. The identifying may be part of the discovery task 406 of FIG. 4, for example.

The process includes, in response to a request to allocate a memory region, sending (at 1004) allocation requests to allocate memory region segments to place interleaved data of the computer across the plurality of memory servers. The allocation requests can include the Allocate_Memory(SIZE/M) requests sent at 408-1 to 408-4, for example.

The process includes receiving (at 1006), at the computer in response to the allocation requests, metadata relating to the memory region segments at the plurality of memory servers, the metadata including base addresses of the memory region segments at the plurality of memory servers. The base addresses can include V1 to V4 in FIG. 5, for example.

The process includes performing the tasks 1008, 1010, and 1012 in response to a request to access requested data.

Task 1008 includes accessing the metadata to create plural I/O requests for plural data portions of the requested data, where the creating of the plural I/O requests includes computing, using the metadata, fabric attached memory addresses (e.g., REMOTE_FAM_POINTER) to include in the plural I/O requests, the fabric attached memory addresses specifying locations of the requested data in the plurality of memory servers that are attached to the network. The plural I/O requests can be created in a loop, such as the loop 606 of FIG. 6, for example.

Task 1010 includes collecting the I/O requests into respective I/O request data structures for corresponding memory servers of the plurality of memory servers. The I/O request data structures include the I/O vectors 702-1 to 702-4, for example.

Task 1012 includes issuing the I/O requests from the I/O request data structures to perform the access (e.g., write) of the requested data (e.g. write data) that is interleaved across the plurality of memory servers, where the interleaving of the requested data across the plurality of memory servers is performed without coordination of a central controller.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A storage medium (e.g., 804 in FIG. 8 or 900 in FIG. 9) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computer comprising:
a processor; and
a non-transitory storage medium storing client instructions executable on the processor to:
implement a client using the client instructions;
identify a plurality of memory servers accessible by the computer to perform remote access over a network of data stored by the plurality of memory servers;
generate, by the client, allocation requests to allocate memory segments to place interleaved data of the computer across the plurality of memory servers;
send the allocation requests to the plurality of memory servers;
receive, at the computer in response to the allocation requests, metadata relating to the memory segments at the plurality of memory servers, the metadata comprising addresses of the memory segments at the plurality of memory servers; and
use the metadata to access, by the computer, the interleaved data at the plurality of memory servers, the interleaved data comprising blocks of data distributed across the memory segments.

2. The computer of claim 1, wherein the client instructions are executable on the processor to:
store the metadata in a descriptor in a memory of the computer; and
access the descriptor to determine an address offset for a collection of blocks of data to be accessed by the computer.

3. The computer of claim 2, wherein the client instructions are executable on the processor to:
access the descriptor to determine an identifier of a memory server at which the collection of blocks of data is stored.

4. The computer of claim 2, wherein each block of data of the blocks of data in the collection has an interleave size, and wherein the determining of the address offset for the collection of blocks of data is based on the metadata in the descriptor and the interleave size.

5. The computer of claim 1, wherein the client instructions are executable on the processor to:
distribute the blocks of data across the memory segments in a round-robin manner to provide the interleaved data.

6. The computer of claim 1, wherein interleaving of data across the memory segments at the plurality of memory servers is controlled by the client instructions without coordination of a central network device controlling memory allocations for a plurality of requesting devices including the computer.

7. The computer of claim 1, wherein the memory segments allocated are for a first data item and a second data item, and wherein the client instructions are executable on the processor to:
place first interleaved data of the first data item across the memory segments; and
place second interleaved data of the second data item across the memory segments,
wherein each of the first interleaved data and the second interleaved data comprises blocks of data distributed across the memory segments, wherein a beginning block of the first data item is at a first memory server of the plurality of memory servers, and a beginning block of the second data item is at a different second memory server of the plurality of memory servers.

8. The computer of claim 1, wherein the client instructions are executable on the processor to:
receive a request to write data;
determine respective blocks of data to be written to each respective memory server of the plurality of memory servers; and
gather input/output (I/O) requests for the respective blocks of data into a respective I/O request data structure for the respective memory server at the computer.

9. The computer of claim 8, wherein the gathering produces I/O requests in a plurality of I/O request data structures at the computer, wherein each I/O request data structure of the plurality of I/O request data structures comprises I/O requests for a corresponding memory server of the plurality of memory servers, and wherein the client instructions are executable on the processor to:

issue the I/O requests in the plurality of I/O request data structures as scatter I/O operations that are issued in parallel to the plurality of memory servers.

10. The computer of claim 9, wherein the scatter I/O operations comprise first I/O requests issued to a first memory server of the plurality of memory servers, and second I/O requests issued, in parallel, to a second memory server of the plurality of memory servers.

11. The computer of claim 8, wherein the client instructions are executable on the processor to:
iteratively create the I/O requests in a loop, wherein a first I/O request of the I/O requests created in a first iteration of the loop is for a first memory server of the plurality of memory servers, and a second I/O request of the I/O requests created in a second iteration of the loop is for a second memory server of the plurality of memory servers, wherein the second iteration immediately follows the first iteration in the loop.

12. The computer of claim 11, wherein each corresponding I/O request of the I/O requests includes an address at which a write data portion is to be written for the corresponding I/O request, a location in an input buffer where the write data portion is stored, and a size of the write data portion.

13. The computer of claim 1, wherein the client instructions are executable on the processor to:
receive a request to allocate a memory region of a specified size; and
generate the allocation requests in response to the request to allocate the memory region.

14. The computer of claim 13, wherein the client instructions are executable on the processor to:
in response to the request to allocate the memory region, discover which memory servers of a collection of memory servers are available according to a criterion for allocation of the memory region,
wherein the discovering identifies the plurality of memory servers.

15. The computer of claim 14, wherein the criterion is a memory capacity criterion, wherein the plurality of memory servers are memory servers with available memory capacity that satisfies the memory capacity criterion.

16. The computer of claim 1, wherein the plurality of memory servers comprise memory servers that manage data placement in fabric attached memory.

17. A non-transitory machine-readable storage medium comprising instructions that upon execution cause a computer to:
implement a client;
store, in a memory of the computer, metadata containing identifiers of memory servers across which interleaved data is placed, and base addresses of memory region segments that contain the interleaved data and that are allocated by the client at the computer, wherein the memory servers are part of a fabric attached memory;
using the metadata stored in the memory, create input/output (I/O) requests via the client for respective blocks of data of the interleaved data, wherein creating a first I/O request of the I/O requests comprises:
retrieving a first base address of the base addresses in the metadata,
determining, using the first base address and an interleave size of the interleaved data, a fabric address of a first data portion of the first I/O request, including, in the first I/O request, the fabric address;
add the I/O requests into respective I/O request data structures for the memory servers; and
issue the I/O requests from the I/O request data structures to the fabric attached memory, wherein I/O requests of a first I/O request data structure of the I/O request data structures are issued to a first memory server in parallel with I/O requests of a second I/O request data structure of the I/O request data structures issued to a second memory server.

18. The non-transitory machine-readable storage medium of claim 17, wherein the I/O requests of the first I/O request data structure are gathered into a first I/O operation to the first memory server, and the I/O requests of the second I/O request data structure are gathered into a second I/O operation to the second memory server.

19. A method of a computer, comprising:
implementing a client by the computer;
identifying, by the computer, a plurality of memory servers accessible by the computer to perform remote access over a network of data stored by the plurality of memory servers in a fabric attached memory, wherein the computer is to access a given memory server of the plurality of memory servers using a remote direct memory access (RDMA) comprising a transfer of data through a network interface of the given memory server where the transfer of data does not involve work performed by a main processor that executes an operating system (OS) in the given memory server;
generating, by the client, a request to allocate a memory region;
in response to the request to allocate the memory region, sending allocation requests to allocate memory region segments to place interleaved data of the computer across the plurality of memory servers;
receiving, at the computer in response to the allocation requests, metadata relating to the memory region segments at the plurality of memory servers, the metadata comprising base addresses of the memory region segments at the plurality of memory servers; and
in response to a request to access requested data:
accessing the metadata to create plural input/output (I/O) requests for plural data portions of the requested data, wherein the creating of the plural I/O requests comprises computing, using the metadata, fabric attached memory addresses to include in the plural I/O requests, the fabric attached memory addresses specifying locations of the requested data in the plurality of memory servers that are attached to the network,
collecting the I/O requests into respective I/O request data structures for corresponding memory servers of the plurality of memory servers, and
issuing the I/O requests from the I/O request data structures to perform the access of the requested data that is interleaved across the plurality of memory servers, wherein the interleaving of the requested data across the plurality of memory servers is performed without coordination of a central controller.

20. The method of claim 19, wherein the computer is a first computer, wherein the issuing of the I/O requests comprises issuing, from the first computer, I/O requests of a first I/O request data structure of the I/O request data structures to a first memory server in parallel with I/O requests of a second I/O request data structure of the I/O request data structures issued from the first computer to a second memory server, and
wherein further memory region segments are allocatable across the plurality of memory servers by a second computer separate from the first computer, the second computer to place interleaved data in the further memory region segments.

* * * * *